United States Patent
Nagai

(10) Patent No.: US 8,743,414 B2
(45) Date of Patent: Jun. 3, 2014

(54) IMAGE PROCESSING APPARATUS, IMAGE PROCESSING METHOD AND RECORDING MEDIUM FOR ATTACHING ADDITIONAL INFORMATION TO IMAGES IN AN IMAGE FILE TO FACILTATE SEARCHING THE IMAGE FILE

(75) Inventor: Takuya Nagai, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 236 days.

(21) Appl. No.: 13/328,639

(22) Filed: Dec. 16, 2011

(65) Prior Publication Data

US 2012/0162730 A1    Jun. 28, 2012

(30) Foreign Application Priority Data

Dec. 27, 2010  (JP) .................................. 2010-290493

(51) Int. Cl.
| | |
|---|---|
| G06K 15/00 | (2006.01) |
| H04N 1/40 | (2006.01) |
| G06K 9/00 | (2006.01) |
| G06F 17/28 | (2006.01) |

(52) U.S. Cl.
USPC ......... 358/1.18; 358/3.28; 382/165; 382/170; 715/275

(58) Field of Classification Search
USPC ......... 358/1.18, 538; 707/713, 715, 736, 741, 707/772, 729; 715/206, 207, 275; 382/165, 382/170, 306
See application file for complete search history.

(56) References Cited

U.S. PATENT DOCUMENTS

| | | | |
|---|---|---|---|
| 5,287,204 | A | 2/1994 | Koizumi et al. |
| 5,294,783 | A | 3/1994 | Hammond, Jr. et al. |
| 5,786,906 | A | 7/1998 | Shishizuka |
| 7,072,506 | B1 | 7/2006 | Hirota et al. |
| 7,177,462 | B2 | 2/2007 | Hirota et al. |

(Continued)

FOREIGN PATENT DOCUMENTS

| | | |
|---|---|---|
| JP | 4-90676 | 3/1992 |
| JP | 4-336876 | 11/1992 |

(Continued)

OTHER PUBLICATIONS

Notification of Reason for Refusal dated Jan. 15, 2013 received from the Japanese Patent Office from related Japanese Application No. 2010-290493, together with an English-language translation.

(Continued)

*Primary Examiner* — Barbara Reinier
(74) *Attorney, Agent, or Firm* — Scully, Scott, Murphy & Presser, P.C.

(57) ABSTRACT

An image processing apparatus including an acquisition unit, an extraction unit, a determination unit and an addition unit is provided. The acquisition unit acquires an image of one page from images of a plurality of pages included in one file. The extraction unit extracts color information, which is information about a color of the image of the one page acquired by the acquisition unit. The determination unit determines whether the color information extracted by the extraction unit satisfies a predetermined condition for specifying a page partition. The addition unit adds additional information, by which the page partition can be searched, to at least one of the images of the plurality of pages, when the determination unit determines that the color information satisfies the predetermined condition.

12 Claims, 12 Drawing Sheets

(56) References Cited

U.S. PATENT DOCUMENTS

| | | | |
|---|---|---|---|
| 7,319,786 B2 | 1/2008 | Hirota et al. | |
| 7,385,737 B2 | 6/2008 | Zaima | |
| 7,583,906 B2 | 9/2009 | Bessho | |
| 7,620,239 B2 | 11/2009 | Minamino | |
| 7,680,425 B2 | 3/2010 | Hama et al. | |
| 7,813,846 B2 | 10/2010 | Wills et al. | |
| 7,821,526 B2 | 10/2010 | Nagata et al. | |
| 7,920,200 B2 | 4/2011 | Azuma | |
| 8,521,045 B2 | 8/2013 | Inada et al. | |
| 2002/0131641 A1* | 9/2002 | Luo et al. | 382/218 |
| 2004/0005076 A1* | 1/2004 | Hosaka et al. | 382/100 |
| 2008/0187214 A1 | 8/2008 | Shoda | |
| 2008/0209549 A1 | 8/2008 | Ishigaki | |
| 2008/0270361 A1* | 10/2008 | Meyer et al. | 707/3 |

FOREIGN PATENT DOCUMENTS

| | | | | |
|---|---|---|---|---|
| JP | 2002-312385 A | | 10/2002 | |
| JP | 2004-200779 A | | 7/2004 | |
| JP | 2006-244174 | * | 9/2006 | G06T 1/00 |
| JP | A-2006-244174 | | 9/2006 | |
| JP | 2007-28164 | | 2/2007 | |
| JP | 2007-251740 | | 9/2007 | |
| JP | 2008-193680 | | 8/2008 | |
| JP | 2008-197796 A | | 8/2008 | |
| JP | 2008-210237 A | | 9/2008 | |
| JP | 2009-94596 A | | 4/2009 | |
| JP | 2009-094597 A | | 4/2009 | |
| JP | 2009-094598 A | | 4/2009 | |
| JP | 2010-130500 A | | 6/2010 | |

OTHER PUBLICATIONS

Official Action dated Apr. 16, 2013 from related U.S. Appl. No. 13/240,633.

U.S. Appl. No. 13/240,633, to Mori, filed Sep. 22, 2011.

Japanese Office Action dated Aug. 6, 2013 from related Japanese Application No. 2010-290493, together with an English language translation.

Notice of Allowance dated Sep. 17, 2013 in related U.S. Appl. No. 13/240,633.

* cited by examiner

IMAGE PROCESSING APPARATUS, IMAGE
PROCESSING METHOD AND RECORDING
MEDIUM FOR ATTACHING ADDITIONAL
INFORMATION TO IMAGES IN AN IMAGE
FILE TO FACILTATE SEARCHING THE
IMAGE FILE

CROSS-REFERENCE TO RELATED
APPLICATIONS

This application claims priority from Japanese Patent Application No. 2010-290493 filed on Dec. 27, 2010, the entire contents of which are incorporated herein by reference.

TECHNICAL FIELD

Aspects of the invention relate to an image processing apparatus and an image processing method, which set additional information for searching a specific page from a plurality of pages included in an image file.

BACKGROUND

There are needs for classifying a plurality of pages included in an image file into predetermined groups (for example, titles) and thus easily searching the respective groups. Regarding this, an image processing apparatus has been suggested in which additional information is attached to a specific page of a plurality of pages included in an image file, and the specific page can be easily searched by searching the additional information. For example, according to an apparatus disclosed in related-art, a bookmark image is attached on an image of the specific page as the additional information. The apparatus searches the bookmark image to easily search the specific page. Also, according to the related-art apparatus, a user divides an original document into predetermined groups and attaches the bookmark image on each leading page. The apparatus reads each page having the bookmark image attached thereon together with the other pages, and thus, an image file including the page having the bookmark image attached thereon is generated.

When preparing the image file by using the above-described apparatus, it is necessary for the user to attach the bookmark image on the original document. Accordingly, when the number of pages on which the bookmark should be attached becomes large, a quantity of work for attaching the bookmark image also increases, an that it becomes inconvenient for the user.

SUMMARY

Accordingly, aspects of the invention provides an image processing apparatus and an image processing method capable of attaching additional information for searching without work by a user.

In order to solve the above-described problem, according to an aspect of the invention, there is provided an image processing apparatus including an acquisition unit, an extraction unit, a determination unit and an addition unit is provided. The acquisition unit acquires an image of one page from images of a plurality of pages included in one file. The extraction unit extracts color information, which is information about a color of the image of the one page acquired by the acquisition unit. The determination unit determines whether the color information extracted by the extraction unit satisfies a predetermined condition for specifying a page partition. The addition unit adds additional information, by which the page partition can be searched, to at least one of the images of the plurality of pages, when the determination unit determines that the color information satisfies the predetermined condition.

According to another aspect of the invention, there is provided an image processing method including: acquiring an image of one page from images of a plurality of pages included in one file; extracting color information, which is information about a color of the image of the one page acquired by the acquisition unit; determining whether the color information extracted by the extraction unit satisfies a predetermined condition for specifying a page partition, and adding additional information, by which the page partition can be searched, to at least one of the images of the plurality of pages, when the determination unit determines that the color information satisfies the predetermined condition.

According to another aspect of the invention, there is provided a computer readable recording medium storing a computer program, the computer program causing a computer to perform the method of acquiring an image of one page from images of a plurality of pages included in one file; extracting color information, which is information about a color of the image of the one page acquired by the acquisition unit; determining whether the color information extracted by the extraction unit satisfies a predetermined condition for specifying a page partition; and adding additional information, by which the page partition can be searched, to at least one of the images of the plurality of pages, when the determination unit determines that the color information satisfies the predetermined condition.

DETAILED DESCRIPTION

Hereinafter, an illustrative embodiment of the invention will be described with reference to the drawings. The drawings are provided to illustrate technical features that can be adopted by the invention. The described and shown configurations of an apparatus, flowcharts of various processes and the like are not limited to the descriptions and are just exemplary. A foreside, a backside, a left side, a right side, an upper side and a lower side in FIG. 2 are a right side, a left side, a front side, a rear side, an upper side and a lower side of an image processing apparatus 1, respectively.

Figure 1:
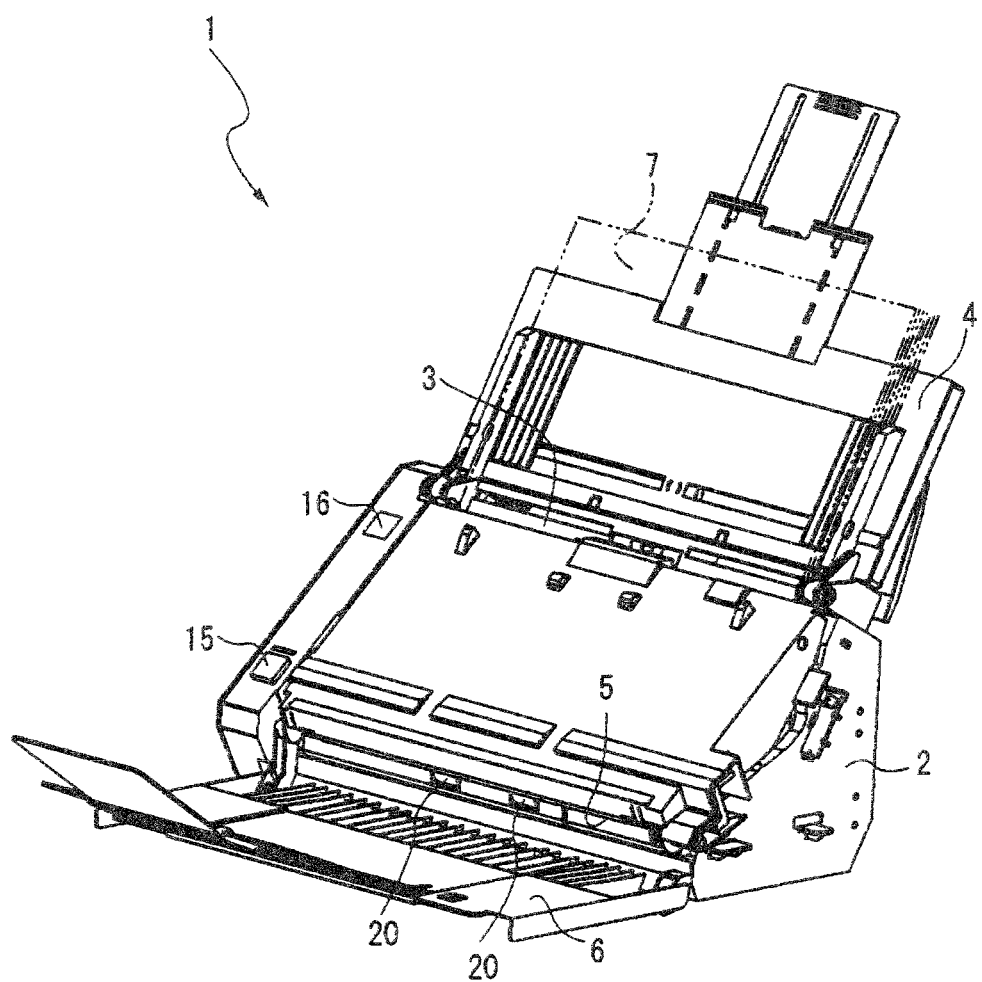
FIG. 1 is a perspective view of an image processing apparatus 1.

A schematic configuration of the image processing apparatus 1 is described with reference to FIGS. 1 and 2. The image processing apparatus 1 is a type of an image scanner. As shown in FIG. 1, the image processing apparatus 1 has a main body part 2, a sheet feeding tray 4 and a sheet discharge tray 6. The main body part 2 has a substantially triangular shape, when seen from a side surface, A sheet feeding opening 3 is provided at an upper side of the main body part 2, A sheet discharge opening 5 is provided at a front-lower side of the main body part 2. The sheet feeding tray 4 is connected to a rear side of the sheet feeding opening 3 of the main body part 2 and extends upward. The sheet discharge tray 6 is connected to a lower side of the sheet discharge opening 5 of the main body part 2 and extends forward. Sheets 7 that are set on the sheet feeding tray 4 are fed one by one from the sheet feeding opening 3 to the main body part 2. The fed sheet 7 is discharged from the sheet discharge opening 5 and is stacked on the sheet discharge tray 6. A start switch 15 and an error lamp 16 are provided on a left inclined surface of the front side of the main body part 2. A user can start the feeding of the sheets 7 by operating the start switch 15. The error lamp 16 lights up when a problem such as sheet jamming occurs.

Figure 2:
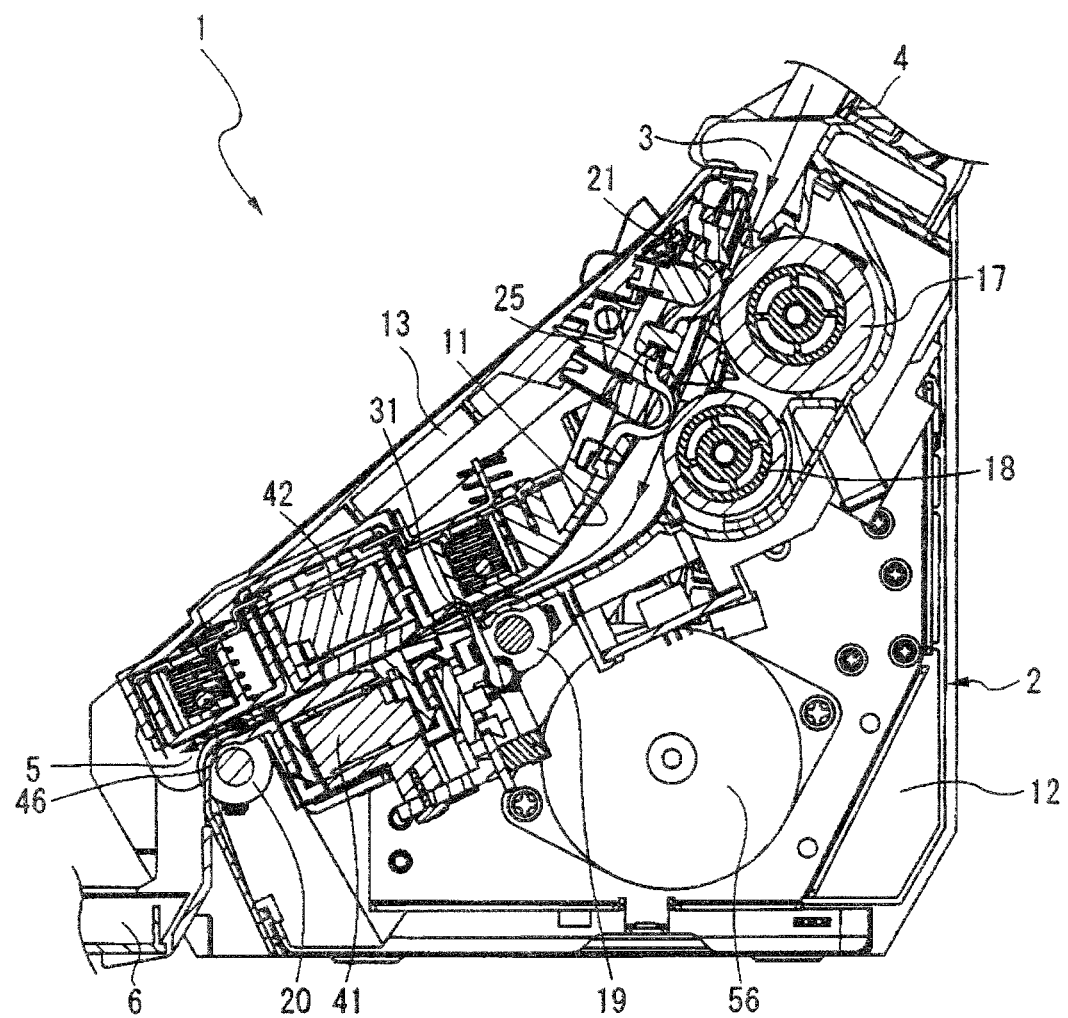
FIG. 2 is a projective view showing an internal structure of the image processing apparatus 1 seen from a right side.

As shown in FIG. 2, the main body part 2 has a conveyance path 11, a lower side frame 12 and an upper side frame 13. The sheet 7 fed from the sheet feeding opening 3 passes through the conveyance path 11 and is discharged from the sheet discharge opening 5. The lower side frame 12 is provided below the conveyance path 11. The upper side frame 13 is provided above the conveyance path 11.

The lower side frame 12 has conveyance rollers 17, 18, 29, 20, a motor 56 and a line sensor 41. The conveyance roller 17 is provided near the sheet feeding opening 3. The conveyance rollers 18, 19, 20 are provided at a downstream side, in the conveyance direction, of the conveyance roller 17. The conveyance rollers 18, 19, 20 are provided in order from an upstream side in the conveyance direction toward the downstream side in the conveyance direction. The conveyance roller 17 feeds the sheet 7, which is set on the sheet feeding tray 4, into the conveyance path 11. The conveyance rollers 18, 19 convey the sheet fed into the conveyance path 11 toward the sheet discharge opening 5. The conveyance roller 20 discharges the sheet 7 from the sheet discharge opening 5. The motor 56 drives the conveyance rollers 17, 18, 19, 20.

The line sensor 41 is provided at a downstream side, in the conveyance direction, of the conveyance roller 19. The line sensor 41 is a contact image sensor (CIS). A length of the line sensor 41 in the left-right direction is the substantially same as that of the conveyance path 11 in the left-right direction. The line sensor 41 can read an image of a lower surface of the sheet 7 that is conveyed along the conveyance path 11. The line sensor 11 has a light source, a lens and a light receiving device. The light source illuminates the light on the lower surface of the sheet 7. The light receiving device collects the reflected light, which is reflected by the sheet 7, by the lens, converts the collected reflected light into RGB signals and outputs the RGB signals. By performing the image processing for the output RGB signals, an image of the lower surface of the sheet 7 is obtained in a page unit.

The upper side frame 13 has separation members 21, 25, pinch rollers 31, 46 and a line sensor 42. The separation members 21, 25 are high frictional elastic members such as rubber. The separation member 21 is provided at a position opposed to the conveyance roller 17. The separation member 25 is provided at a position opposed to the conveyance roller 18. The separation members 21, 25 are provided to separate the lowest sheet 7 among the sheets 7 set on the sheet feeding tray 4 from the other sheets. The pinch roller 31 is provided at a position opposed to the conveyance roller 19. The pinch roller 46 is provided at a position opposed to the conveyance roller 20. The pinch rollers 31, 46 are rotated together with the conveyance rollers 19, 20, thereby conveying the sheet 7.

The line sensor 42 is provided at a position opposed to the line sensor 41. The line sensor 42 is a CIS. A length of the line sensor 42 in the left-right direction is substantially same as that of the conveyance path 11 in the left-right direction. The configuration and driving mechanism of the line sensor 42 are the same as those of the line sensor 41. The line sensor 42 can read an image of an upper surface of the sheet 7 that is conveyed along the conveyance path 11.

Figure 3:
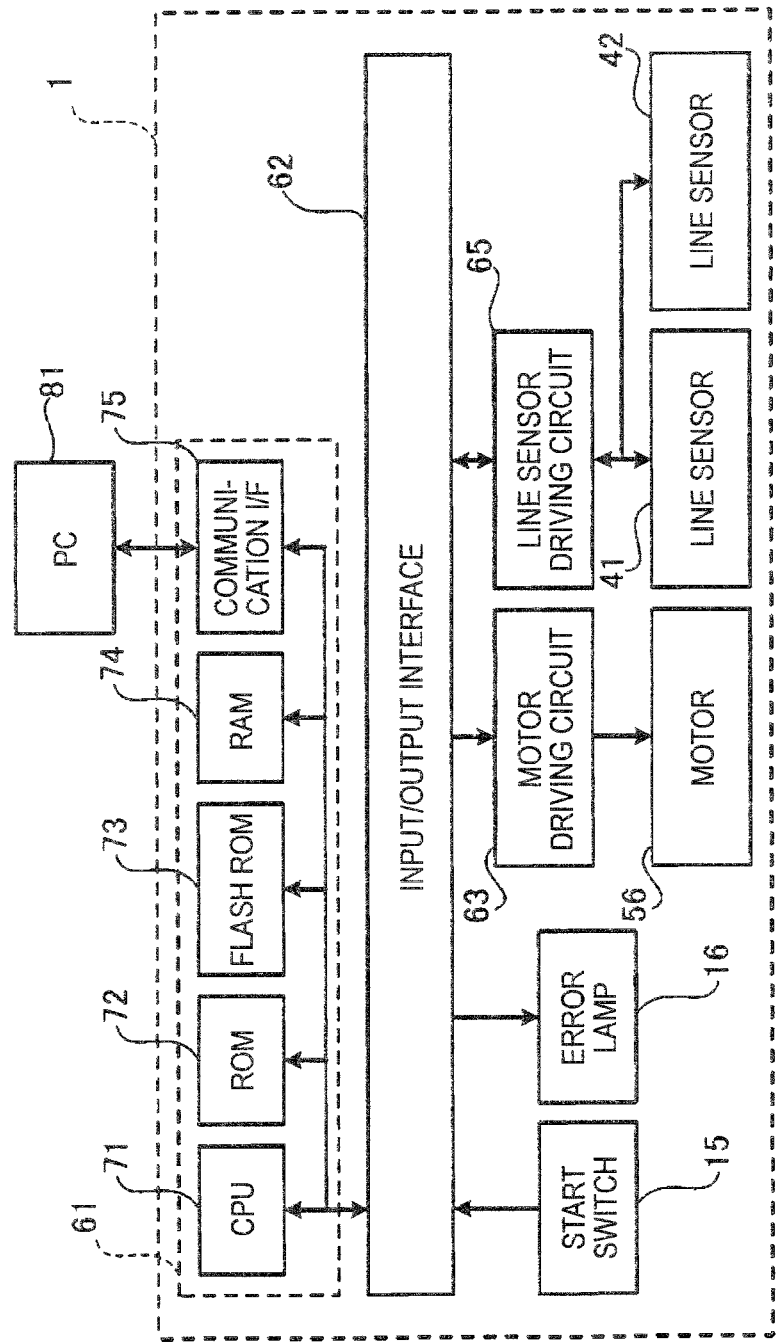
FIG. 3 is a block diagram showing an electrical configuration of the image processing apparatus 1.
Figure 4:
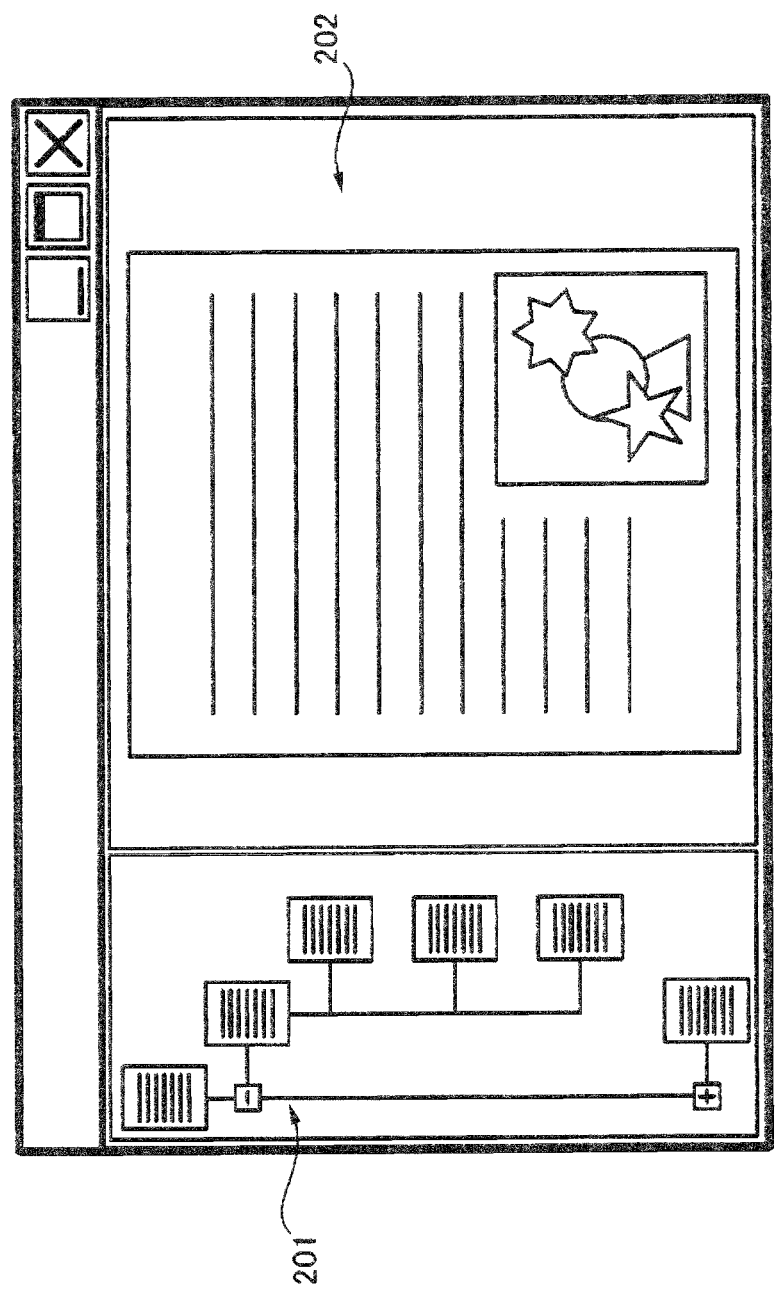
FIG. 4 shows an example in which a file including an image having additional information attached thereon is displayed.

An electrical configuration of the image processing apparatus 1 is described with reference to FIG. 3. The image processing apparatus 1 has a control circuit unit 61. The control circuit unit 61 is electrically connected to the start switch 15, the error lamp 16, a motor driving circuit 63 and a line sensor driving circuit 65 through an input/output interface 62.

The control circuit unit 61 has a Central Processing Unit (CPU) 71, a Read-Only Memory (ROM) 72, a FLASH ROM 73, a Random Access Memory (RAM) 74 and a communication interface (I/F) 75. The CPU 71 is a calculation device that controls the entire image processing apparatus 1. The ROM 72 stores therein various parameters that are required when the CPU 71 executes processes. The FLASH ROM 73 stores therein programs with which the CPU 71 executes the processes. The RAM 74 temporarily stores therein various calculation results calculated by the CPU 71 and the images read by the line sensors 41, 42. The communication I/F 75 controls a timing when performing communication with a PC Si that is connected externally.

The motor driving circuit 63 is connected to the motor 56. The motor driving circuit 63 drives and controls the motor 56 in response to an instruction from the CPU 71 of the control circuit unit 61. The line sensor driving circuit 65 is connected to the line sensors 41, 42. The line sensor driving circuit 65 performs a driving control for turning on the light sources of the line sensors 41, 42 in response to instructions from the CPU 71 of the control circuit unit 61. Also, the line sensor driving circuit 65 converts the electrical signals from the light receiving devices into RGB signals and outputs the same. The CPU 71 can generate an image, based on the RGB signals received from the line sensor driving circuit 65 and the like, and temporarily store the same in the RAM 74.

Hereinafter, a series of processes that are executed by the image processing apparatus 1 are described. The image processing apparatus 1 feeds the sheets 7 into the image processing apparatus 1, which are set on the sheet feeding tray 4, from the sheet feeding tray 3 one by one. Images of each sheet 7 are read by the line sensors 41, 42. When images are formed on both surfaces of the sheet 7, the images on both surfaces are read by the line sensors 41, 42 at the same time. When an image is formed on one surface of the sheet 7, the image is read by one of the line sensors 41, 42. A plurality of images, which are obtained by reading out the plurality of sheets 7, is managed as one file. The respective images are arranged in a page unit, in an order that the images are read.

The image processing apparatus 1 analyzes the respective read images to select a partition page, which is the image of a first page or a last page of a group, for each of predetermined groups, for example, titles. When an image of a last page of a group is selected, an image in a next page of the selected image is selected as an image of a first page of the next group. The image processing apparatus 1 adds additional information, by which the image can be searched, to image data of the first page of the group. The additional information is information for distinguishing an image of a specific page, among the images of the pages configuring the file, from an image of another page.

For example, as the additional information, code information based on a predetermined rule may be added to the image data of the first page of the group. When a file including the image having the additional information added thereto is displayed on the PC 81 and the like, a separate window 201 that hierarchically shows the groups may be displayed separately from a window 202 on which the image itself is displayed. Thereby, a user can search a partition page from the separate window 201 and thus recognize the image for each group. Accordingly the user can search a desired image easily and quickly.

Also, for example, when a file including an image having the code information added thereto as the additional information is displayed on the PC 81 and the like, an image of a page having the additional information added thereto may be displayed distinguishingly from the images of other pages. For example, the image of the page having the additional information added thereto may be highlighted. Alternatively, an image of the page having the additional information added thereto may be searched by keyword searching.

Figure 5:
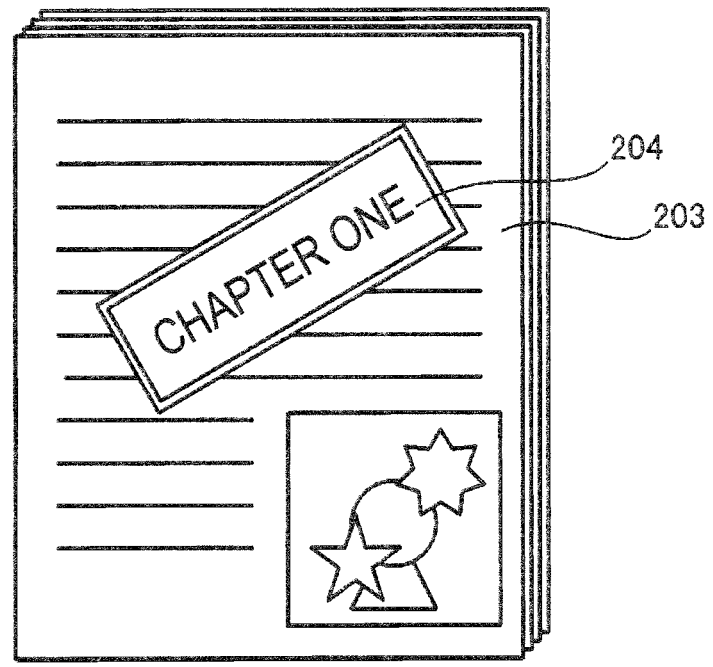
FIG. 5 shows an example in which an annotation image 204 is added as the additional information.

Also, for example, as shown in FIG. 5, an annotation image 204, which is overlapped with an image 203 of a first page of a group, may be added as the additional information. When a file including the image 203 having the annotation image 204 added thereto is displayed on the PC 81 and the like, a user may scroll the file in page order to intuitively recognize the first page of a group.

In the above description, the example has been described in which the additional image is added to the image of the first page of a group so as to recognize the first page of a group. However, the invention is not limited thereto. For example, the additional information may be added to images of all pages in a way that the first page of a group can be recognized. Also, the information for specifying the first page of a group may be added to the file itself, separately from the image.

Whether or not a page is a partition page of each group can be determined based on information about an image color. The information about each color is hereinafter referred to as "color information". The color information includes a background color of an image, a ratio of a background color to all of the colors of an image and a number of image colors. A first example of the determination method is described with reference to FIG. 6. It is assumed that images 111, 112, 113, 114, 115 are respectively read from the five sheets 7. Among the images, background colors of the images 111, 112, 114, 115 are white and a background color of the image 113 is a predetermined color other than white. In this case the image 113 is selected as the first page of a group. The images 111, 112 configure one group 116 and the images 113, 114, 115 configure another group 117. This method is effective for a case where a medium, in which the sheets 7 having different background colors for each partition of a title are inserted, such as materials filed for each field, is used, because it is possible to correctly recognize the first page of a predetermined group.

For example, the background color of an image is specified in the following way. RGB values of each pixel configuring an image are specified. Based on the specified RGB values, the number of pixels is summed for each of the pixels having the same ROB values. A color, which is unambiguously determined from the RGB values having the largest summed number of pixels, is specified as the background color of the image. However, the method of specifying the background color is not limited to the above.

Whether the background color is a predetermined color other than white or not may also be determined in the following way. For example, when at least one of color phase, chroma and brightness of the background color of an image is a predetermined value or larger, it may be determined that the background color is a predetermined color. For example, when the brightness is different from white by 10% (25 bits of 255 bits), it may be determined that the background color is a color other than white. Alternatively, when at least one of the differences between the color phase, chroma and brightness of a background color of an image and the color phase, chroma and brightness of a background color of an image of another page is a predetermined value or larger, it may be determined that the background color is a predetermined color.

Figure 7:
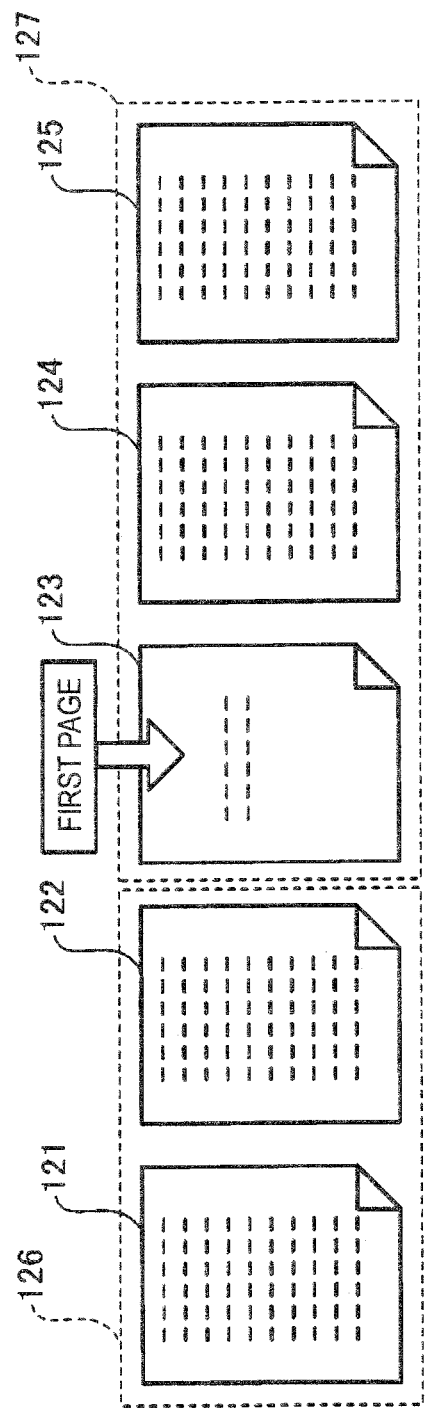
FIG. 7 is a view showing a frame format of addition method of the additional information.

A second example of the determination method is described with reference to FIG. 7. It is assumed that images 121, 122, 123, 124, 125 are respectively read from the five sheets 7. Also, it is assumed that the number of letters, which are included in the image 123, is smaller, compared to the number of letters included in the other images. A ratio of the background color to all of the colors of the image 123 is larger than ratios of the background colors in the other images because the number of letters is smaller. In this case, the image 123 having the larger ratio of the background color is selected as a first page of a predetermined group. The images 121, 122 configure one group 126 and the images 123, 124, 125 configure another group 127. For example, it may be determined that an image having the background color is a first page when the ratio of the background color is 3% or lower. This method is efficient for a case where when a medium, in which a topic page is arranged following a title page is used, such as journal, collection of papers and the like, because it is possible to correctly select the title page as the first page of a predetermined group.

Figure 8:
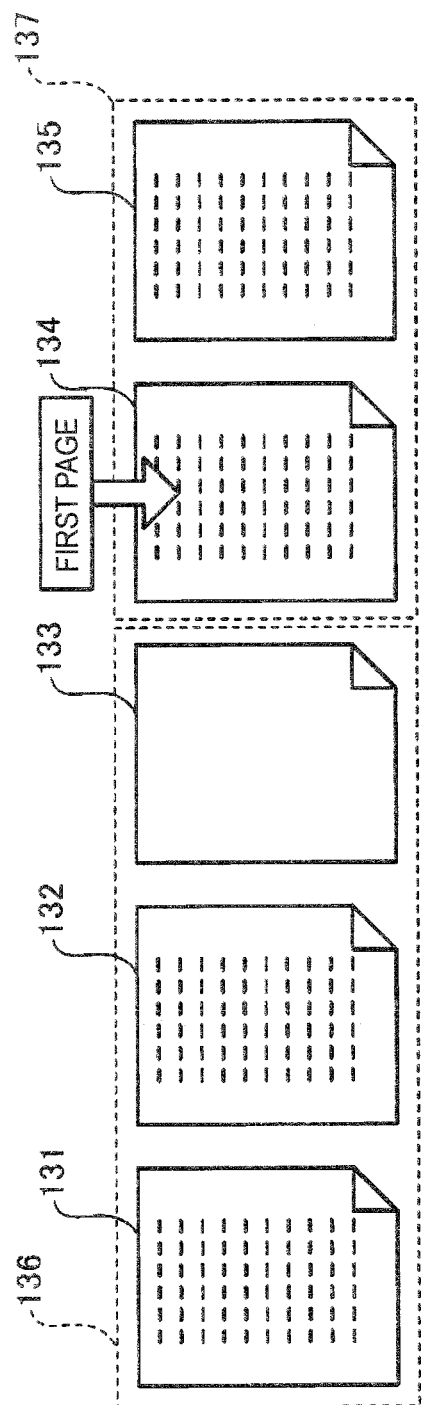
FIG. 8 is a view showing a frame format of an addition method of the additional information.

Further, for example, as shown in FIG. 8, it is assumed that images 131, 132. 133, 134. 135 are respectively read from the five sheets 7. Also, it is assumed that the image 133 does not include a letter and the other images include letters. A ratio of the background color of the image 133 is extremely higher than those of the background colors of the other pages, because the image 133 does not include a letter. In this case, the image 133 having the extremely higher ratio of the background color is selected as a last page of a predetermined group. The image 134 of a next page of the image 133 is selected as the first page of a predetermined group. The images 131, 132, 133 configure one group 136 and the images 134, 135 configure another group 137. This method is efficient for a case where a medium, in which a blank page for distinguishing groups is inserted, is used, such as collective work in which critiques written by a plurality of authors are collected, because it is possible to correctly select a last page of a group. When performing the determination, since the image 133 becoming the last page does not have any information thereon, the image 133 may be deleted.

For example, the ratio of the background color is specified in the following way. The background color is specified from the RUB values of each pixel configuring an image, and the number of pixels having the background color is then specified. The ratio of the background color is calculated by calculating a ratio of the specified number of pixels to a number of all of the pixels in the image. However, the method of specifying the ratio of the background color is not limited to the above.

In addition, the determination based on the ratio of the background color may be performed in the following way. For example, when a ratio of a background color of an image is a predetermined threshold value or higher, it is determined that the ratio of the background color is relatively high, and the corresponding image may be thus selected as an image of the first page of a group. Here, when a ratio of the background color of an image becomes 100%, it is determined that the ratio of the background color is extremely high, and the corresponding image may be thus selected as an image of the last page of a group.

The determination based on the ratio of the background color may also be performed in the following way. When a difference between a ratio of a background color of an image and a ratio of a background color of an image of another page is a first threshold value or larger and smaller than a second threshold value, it is determined that the ratio of the background color of the image is relatively high, compared to the ratio of the background color of the image of another page. The first threshold value is smaller than the second threshold value. In this case, the image may be thus selected as an image of the first page of a group. In the meantime, when the difference is the second threshold value or larger, it is determined that the ratio of the background color of the image is extremely high, compared to the ratio of the background color of the image of another page, and the image may be thus selected as an image of the last page of a group.

Figure 9:
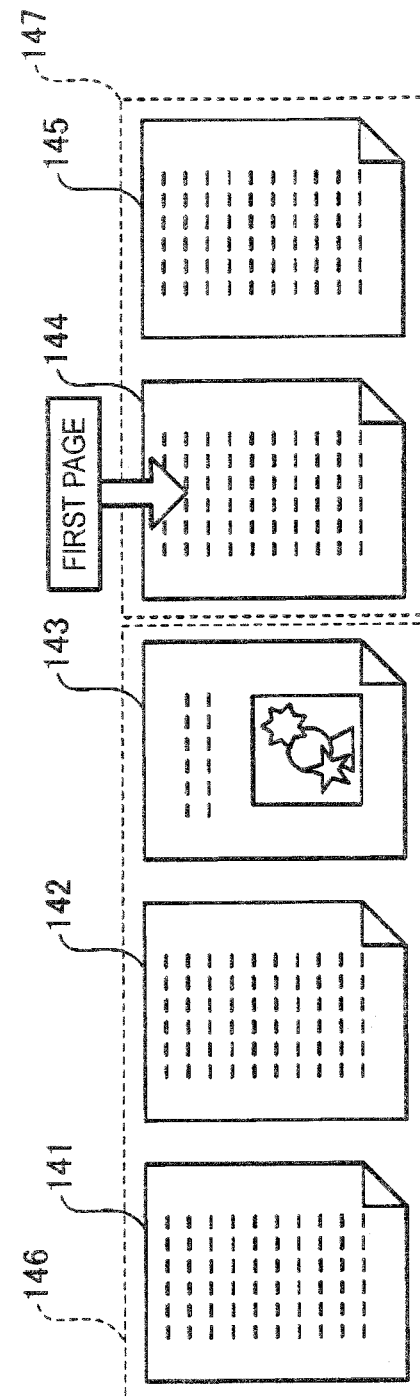
FIG. 9 is a view showing a frame format of an addition method of the additional information.

A third example of the determination method is described with reference to FIG. 9. It is assumed that images 141, 142, 143, 144, 145 are respectively read from the five sheets 7. Also, it is assumed that the image 143 includes an image or photograph and the other images do not include an image or photograph. The number of colors of the image 143 is larger, compared to the number of colors of the other images. In this case, the image 143 having the larger number of colors is selected as the last page of a predetermined group. The image 144 of a next page of the image 143 is selected as the first page of a predetermined group. The images 141, 142, 143 configure one group 146 and the images 144, 145 configure another group 147. This method is efficient for a case where when a medium, in which an illustrative view is shown on the last page of a group, is used, such as reference materials including figure description, because it is possible to correctly select the last page of a group.

For example, the number of colors is specified in the following way. The RGB values of each pixel configuring an image are specified. A color that is unambiguously determined from the RGB values is specified for each pixel. The number of the specified colors is specified as the number of colors of the image. However, the method of specifying the number of colors is not limited to the above.

The determination based on the number of colors may be alternatively performed in the following way. For example, when the number of colors of an image is a predetermined threshold value or larger, the image may be selected as an image of the last page of a group. Alternatively, when a difference between the number of colors of one image and the number of colors of an image of another page is a predetermined threshold value or larger, the one image may be selected as an image of the last page of a group.

Figure 10:
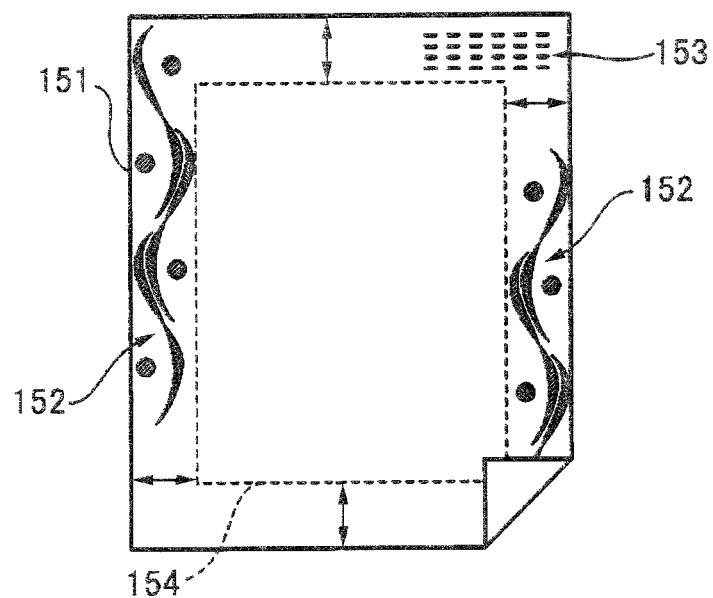
FIG. 10 is a view showing a frame format of a method of extracting color information.

The respective color information that has been described in the first to third examples may be extracted from a region of an image having a predetermined distance or larger from an end of the image. For example, like an image 151 shown in FIG. 10, shaped FIGS. 152, for example, decorative patterns, may be attached at left and right ends of an image. Also, letters 153 may be attached in a header and a footer of an image. Like the FIGS. 152 or letters 153, the figures or letters that are formed near ends of an image may be commonly formed to a plurality of pages, in many cases. Accordingly, when a partition page is selected based on the color information extracted from the figures or letters, a plurality of pages which are not the partition page may be erroneously selected as the partition page. However, according to the image processing apparatus 1, the color information in a region 154, which has a predetermined distance or larger from upper, lower, left and right ends of the image 151, is extracted and is used to select a partition page. Thereby, it is possible to exclude the color information of the region close to the ends of the image from being used in the determination. Accordingly, since it is possible to prevent the colors of the region close to the header, the footer and the left and right ends of an image from influencing the color information, the image processing apparatus 1 can specify the page partition more accurately.

In the above descriptions, the color information in the region 154, which has a predetermined distance or larger from all the upper, lower, left and right ends of the image 151, is extracted. However, the information of a region having a predetermined distance or larger from at least one end of an image may be extracted.

A main process that is executed by the CPU 71 of the image processing apparatus 1 is described with reference to FIG. 11. A plurality of sheets 7 is set on the sheet feeding tray 4 and the start switch 15 is pressed. The image processing apparatus 1 feeds the sheets 7 and starts reading images of the sheets by the line sensors 41, 42. The read images are stored in the RAM 74. The respective read images are arranged in a page unit in an order that the images are read, thereby configuring one file. After the images of all sheets 7 set on the sheet feeding tray 4 are read, the CPU 71 starts up the main process.

The image stored in the RAM 74 is acquired page by page (S11). The color information of the acquired image is extracted (S13). Specifically, at least one of the color information that has been described with reference to FIGS. 6 to 9 is extracted. Also, as described with reference to FIG. 10, the color information may be extracted from a region of the image having a predetermined distance or larger from at least one end of the image.

The CPU 71 determines whether the extracted color information satisfies a predetermined condition (S15). Specifically, the CPU 71 performs determination to the color information based on the determination methods described with reference to FIGS. 6 to 9. When the image from which the color information is extracted corresponds to an image of a partition page, the CPU 71 determines that the predetermined condition is satisfied. In the meantime, when a plurality of types of color information is extracted, the CPU 71 may determine whether all the color information satisfies the predetermined condition or whether any one of the color information satisfies the predetermined condition. When it is determined by the CPU 71 that the color information does not satisfy the predetermined condition (S15: NO), the image does not correspond to an image of a partition page. Hence, the process proceeds to S23.

When it is determined by the CPU 71 that the color information satisfies the predetermined condition (S 15: YES), the CPU 71 determines whether the image acquired in S11 is a first page or last page of a predetermined group (S 17). For example, when the image coincides with the conditions described with reference to FIGS. 6 and 7, the CPU 71 determines that the image is a first image of a predetermined group. On the other hand, when the image coincides with the conditions described with reference to FIGS. 8 and 9, the CPU 71 determines that the image is a last image of a predetermined group.

When it is determined by the CPU 71 that the acquired image is a first page of a predetermined group (S17: YES), the CPU 71 adds the additional information to the acquired image (S19). Then, the process proceeds to S23. When it is determined by the CPU 71 that the acquired image is a last page of a predetermined group (S 17: NO), if there is an image of a next page of the acquired image, the CPU 71 adds an additional image to the image of the next image (S21). Then, the process proceeds to S23.

In S23, the CPU 71 determines whether the image of the next page of the image acquired in S11 is stored in the RAM 74 (S23). When the image of the next page is stored in the RAM 74 (S23: YES), the process returns to S11. The image of the next page is acquired (S11) and the process is repeated. When the image of the next page is not stored in the RAM 74 (S23: NO), the CPU 71 ends the main process.

As described above, the image processing apparatus 1 determines whether a page partition can be specified by the acquired image, based on the color information extracted from the acquired image of one page. When it is determined that the page partition can be specified by the acquired image, the image processing apparatus 1 adds the searchable additional information. The user can easily search the page partition by searching the additional information. Since the image processing apparatus 1 automatically determines whether or not to add the additional information, based on the color information, it is not necessary for the user to add the additional information.

The image processing apparatus 1 can determine whether the acquired page is an image of a partition page, based on the background color of the image, the ratio of the background color and the number of colors, as the color information. Thereby, since the image processing apparatus 1 can correctly specify a page partition and thus add the additional information, it is possible to improve the searching accuracy when the user searches the partition.

The image processing apparatus 1 can determine whether a page partition the color information of the image can be specified based on the relation with the color information of another image. Accordingly, the image processing apparatus 1 can correctly specify the partition page when the partition page is different from the other page. Also, the image processing apparatus 1 can determine whether it is possible to specify a page partition based on the relation between the color information of the image and a predetermined threshold value. Accordingly, if the page partition always has a predetermined feature, the image processing apparatus 1 can determine that it is possible to easily specify the page partition by comparing the color information with the threshold value.

Since the image processing apparatus 1 has the line sensors 41, 42, it can directly read the image from the sheet 7.

Figure 11:
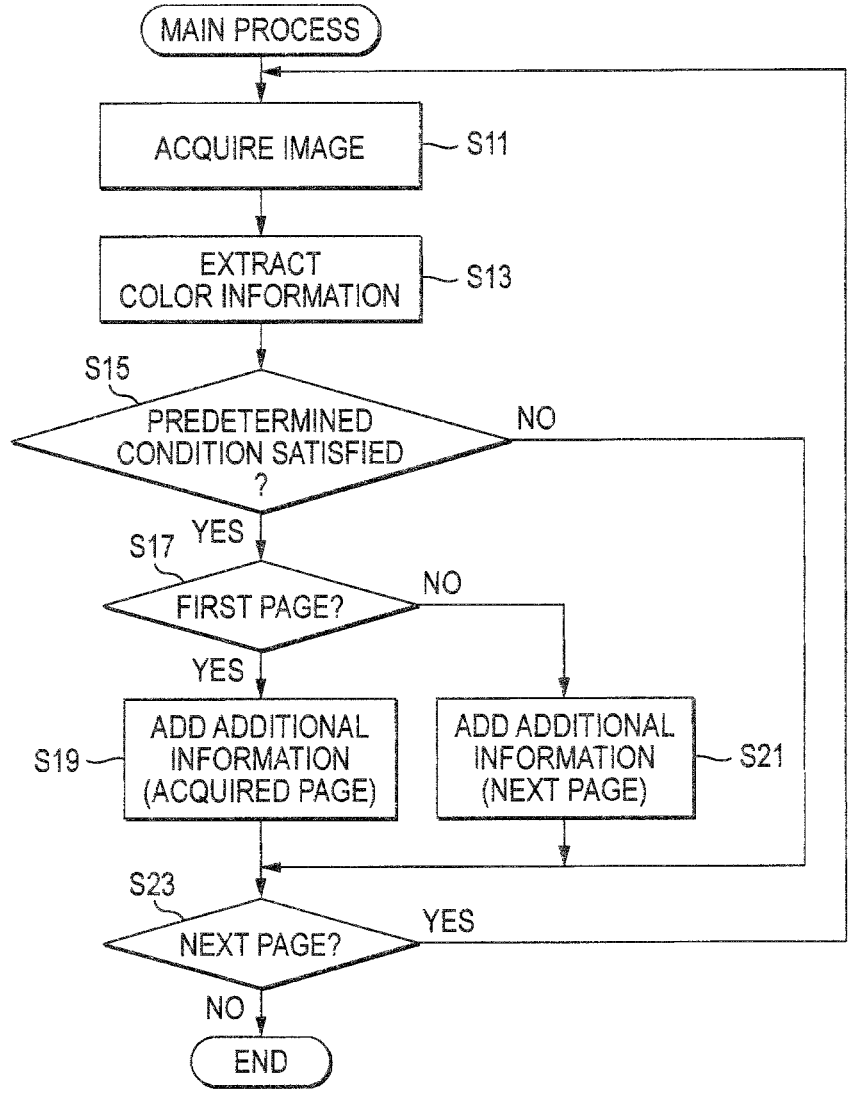
FIG. 11 is a flowchart of a main process.

In the meantime, the CPU 71 that executes the process of S11 of FIG. 11 corresponds to the "acquisition unit", the CPU 71 that executes the process of S13 corresponds to the "extraction unit", the CPU 71 that executes the process of S15 corresponds to the "determination unit" and the CPU 71 that executes the processes of S17, S19 and S21 corresponds to the "addition unit". The line sensors 41, 42 of FIG. 2 correspond to the "reading unit".

The invention is not limited to the above-described illustrative embodiment and can be modified in various ways. Hereinafter, modified embodiments, i.e., a first modified embodiment, a second modified embodiment and a third modified embodiment) are described with reference to FIGS. 12, 13 and 14. In the meantime, the processes overlapping with the main process of the above illustrative embodiment are indicated with the same reference numerals and the descriptions thereof are omitted or simplified.

Figure 6:
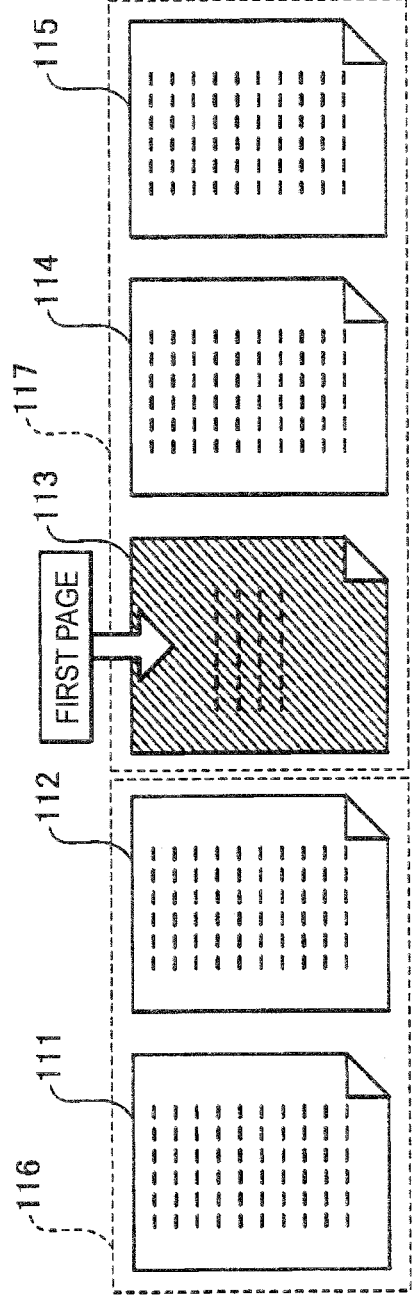
FIG. 6 is a view showing a frame format of an addition method of the additional information.
Figure 12:
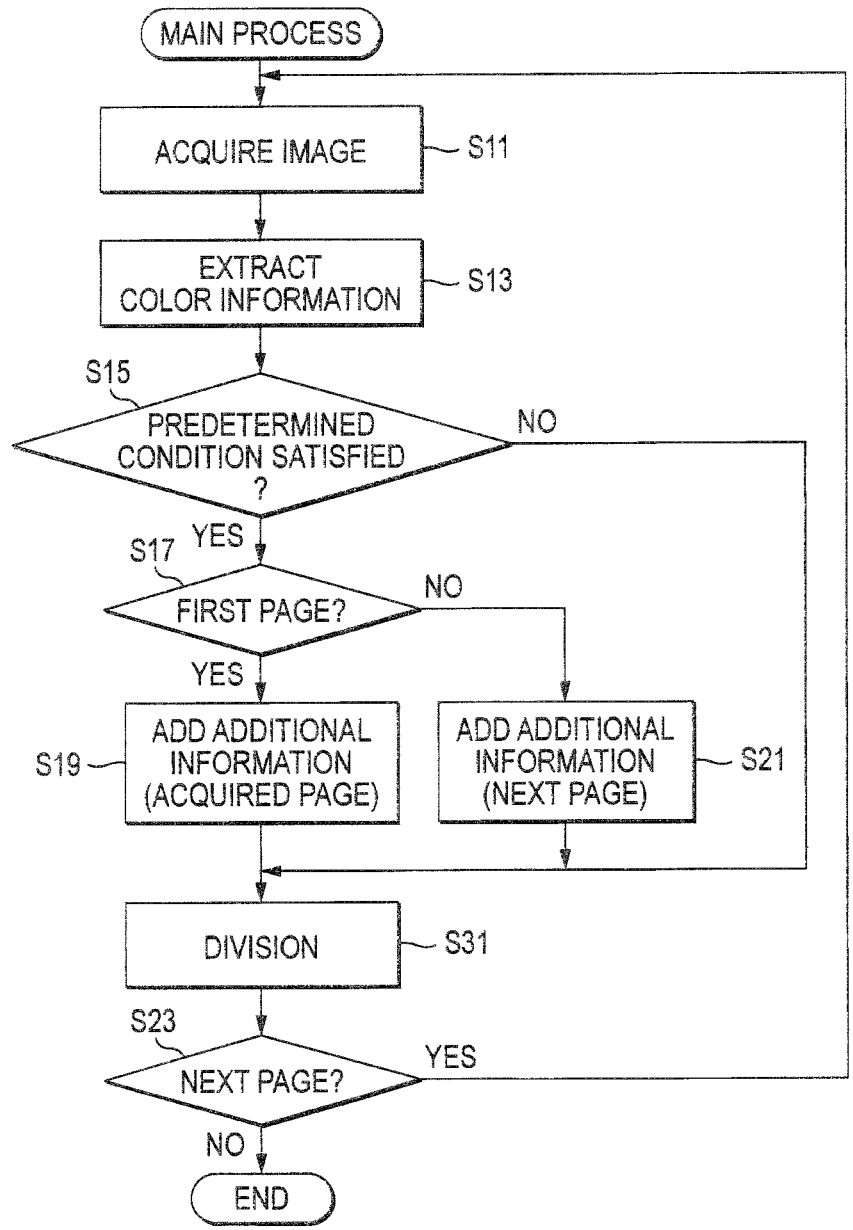
FIG. 12 is a flowchart of a main process in a first modified embodiment.

A main process of a first modified embodiment is described with reference to a flowchart of FIG. 12. In the first modified embodiment, the image processing apparatus 1 divides a file for each predetermined group. When the CPU 71 starts up the main process, the image stored in the RAM 74 is acquired page by page (S11) and the color information of the acquired image is extracted (S13). Then, it is determined whether the extracted color information satisfies a predetermined condition (S15). When it is determined that the color information satisfies the predetermined condition (S15: YES), the additional information is added to the acquired image or an image of a next page (S19, S21). Then, the file including the acquired image is divided into a file including an image of a page preceding an image of a first page of a predetermined group and a file including the image of the first page and an image of a page succeeding the image of the first page (S31). Then, the process proceeds to S23. For example, when a file including the images 111, 112, 113, 114, 115 shown in FIG. 6 is stored in the RAM 74, the file is divided into a file including the images 111, 112 and a file including the images 113, 114, 115.

As described above, the image processing apparatus 1 can extract the image of the partition page and then divide the file for each of the predetermined groups. Thereby, the user can manage the file such that a different file is provided for each predetermined group. In the meantime, the CPU 71 that executes the process of S31 of FIG. 12 corresponds to the "division unit".

Figure 13:
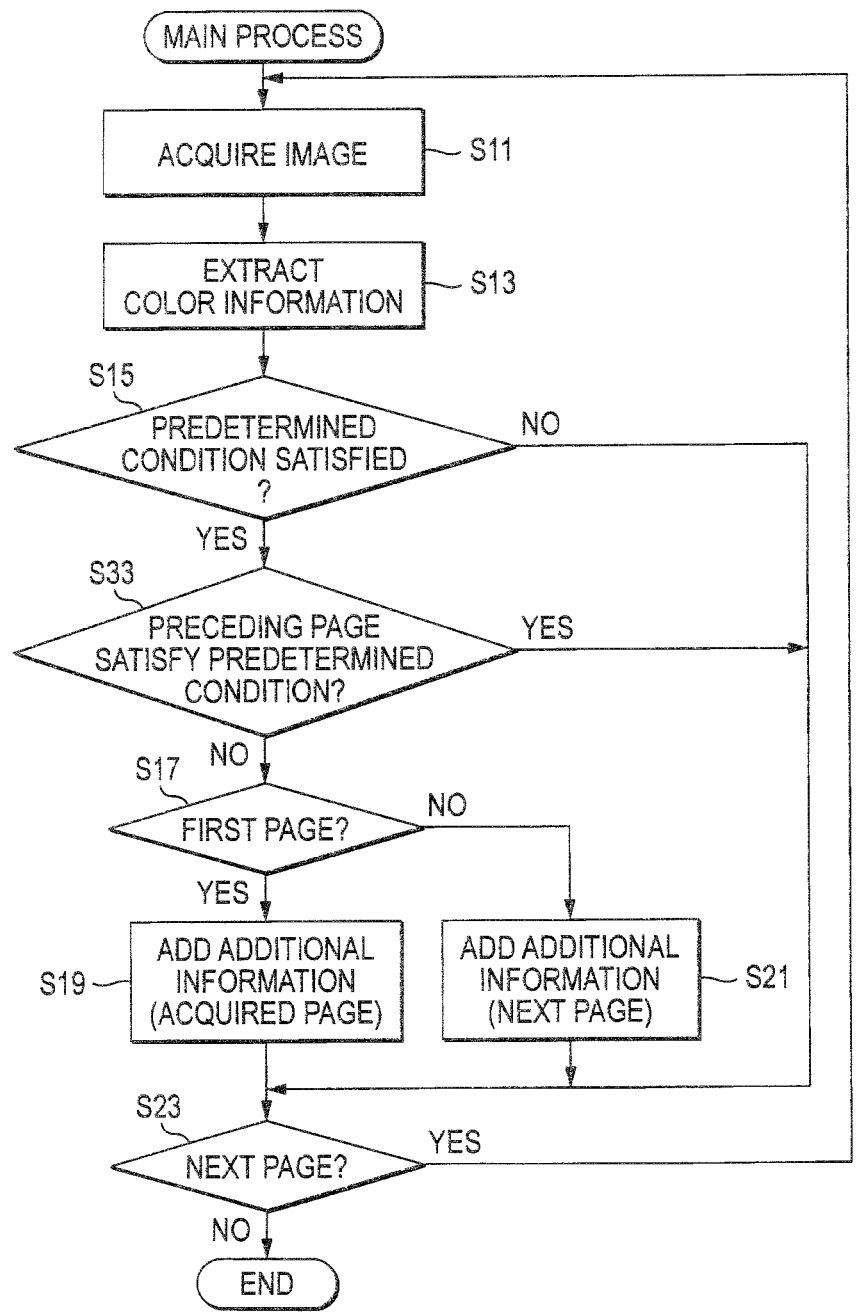
FIG. 13 is a flowchart of a main process in a second modified embodiment.

Hereinafter, a main process of a second modified embodiment is described with reference to a flowchart of FIG. 13. In the second modified embodiment, when the color information satisfying the predetermined condition is extracted from images of continuing pages, only a first image of the consecutive images is selected as an image of a partition page.

When the CPU 71 starts up the main process, the image stored in the RAM 74 is acquired page by page (S11) and the color information of the acquired image is extracted (S13). Then, it is determined whether the extracted color information satisfies a predetermined condition (S15). When it is determined that the color information satisfies a predetermined condition (S15: YES), it is determined whether an image of a page preceding the page acquired in S11 satisfies a predetermined condition (S33). When it is determined that the image of the preceding page satisfies the predetermined condition (S33: YES), the page satin the predetermined condition continues. In this case, the process proceeds to S23 so as not to add an additional image to each of the continuing pages. On the other hand, when the image of the preceding page does not satisfy the predetermined condition (S33: NO), the additional information is added to the acquired image or an image of a next page (S19, S21). Then, the process proceeds to S23.

As described above, the image processing apparatus 1 can prevent the additional information from being added to each of the continuing images. When the user searches the page partition based on the additional information, if one page of the plurality of continuing partition pages can be searched, it is possible to specify the page partition. Accordingly, the image processing apparatus 1 adds the additional information to only the first page of the plurality of partition pages. Thereby, while it is possible to enable the user to search the partition page, it is possible to prevent the convenience of the searching from being deteriorated due to the increase of the number of images having the additional information added thereto.

Figure 14:
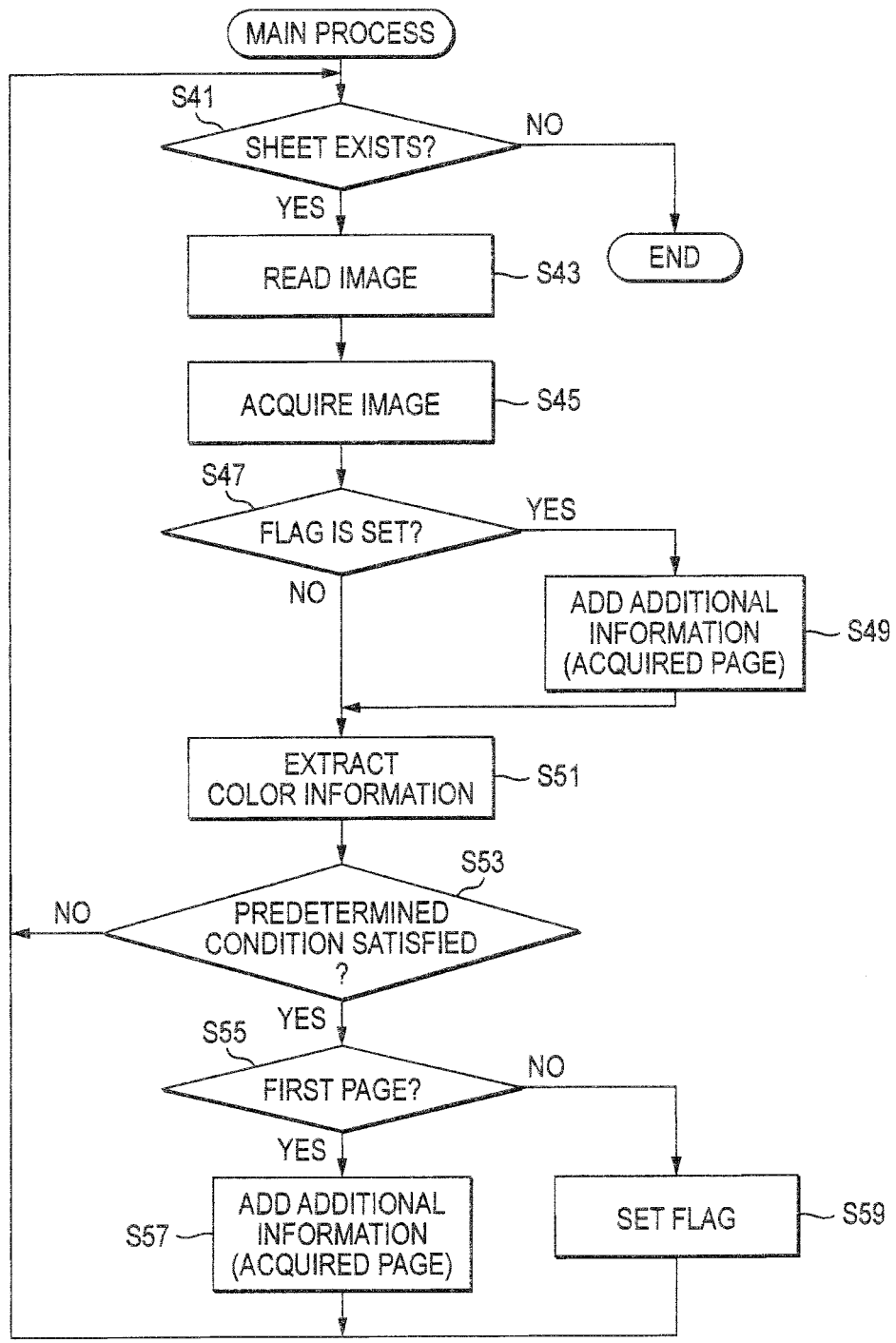
FIG. 14 is a flowchart of a main process in a third modified embodiment.

Hereinafter, a main process of a third modified embodiment is described with reference to a flowchart of FIG. 14. In the third modified embodiment, each time an image is read from the sheet 7, the color information is extracted from the read image. When a plurality of sheets 7 is set on the sheet feeding tray 4 and the start switch 15 is pressed, the CPU 71 starts up the main process.

In the main process, it is determined whether the sheet 7 is set on the sheet feeding tray 4 (S41). When the sheet 7 is set on the sheet feeding tray 4 (S41: YES), one sheet 7 is fed. An image that is formed on the fed sheet 7 is read by the line sensors 41, 42 (S43). The read image is temporarily stored in the RAM 74, The image of one page that is stored in the RAM 74 in S43 is acquired (S45). Then, it is determined whether a flag, which indicates whether or not to add the additional information, is set (S47). The flag is set in S59, which will be specifically described later. Then, at this point of time, since the flag is not set (S47: NO), the color information of the acquired image is extracted (S51).

Then, it is determined whether the extracted color information satisfies a predetermined condition (S53). When it is determined that the extracted color information does not satisfy the predetermined condition (S53: NO), the process returns to S41. On the other hand, when it is determined that the extracted color information satisfies the predetermined condition (S53: YES), it is determined whether the image acquired in S45 is a first page or last page of a predetermined group (S55). When it is determined that the acquired image is the first page of a predetermined group (S55: YES), the additional information is added to the acquired image (557). Then, the process returns to S41. When it is determined that the acquired image is a last page of a predetermined group (S55: NO), it is necessary to add the additional image to an image of a next page of the acquired page. However, at this state, the image of the next page has not been read yet. Accordingly, the flag is set so that the additional image is added after the image of the next page is read (S59). Then, the process returns to S41.

After it is determined in S41 that the next sheet 7 is set on the sheet feeding tray (S41: YES), the sheet 7 is read (S43) and an image of the sheet is acquired (S45), it is determined whether the flag is set (S47). When the flag is set in S59 (S47: YES), the additional information is added to the acquired image (S49). Then, the process proceeds to S51. When it is determined in S41 that the next sheet 7 is not left on the sheet feeding tray (S41: NO), the main process ends.

As described above, each time the image is read from the sheet 7, the image processing apparatus 1 can perform processing to the read image. Thereby, the image processing apparatus 1 can reduce the time necessary to acquire the image and to extract the color information, compared to a configuration where images of all pages are acquired and then the color information is extracted for all pages.

In the main processes of the illustrative and modified embodiments, the processing to the images read by the image processing apparatus 1, in which the partition page is specified and the additional information is added to the specified partition page, is performed by the CPU 71 of the image processing apparatus 1. However, the invention is not limited thereto. The main process may be executed by the PC 81 that is connected to the image processing apparatus 1 through the communication I/F 75. That is, the PC 81 may acquire the image, which is read from the sheet 7 by the image processing apparatus 1, and then execute the above-described main process.

The exemplary embodiments provide illustrative, non-limiting aspects as follows:

(1) According to a first aspect, there is provided an image processing apparatus including: an acquisition unit that acquires an image of one page from images of a plurality of pages included in one file; an extraction unit that extracts color information, which is information about a color of the image of the one page acquired by the acquisition unit; a determination unit that determines whether the color information extracted by the extraction unit satisfies a predetermined condition for specifying a page partition; and an addition unit that adds additional information, by which the page partition can be searched, to at least one of the images of the plurality of pages, when the determination unit determines that the color information satisfies the predetermined condition.

According to the first aspect, the image processing apparatus determines whether the page partition can be specified based on the color information extracted from the acquired image of one page. When it is determined that the page partition can be specified, the image processing apparatus adds the searchable additional information. A user can refer to the additional information to easily search the page partition. Since the image processing apparatus automatically determines whether or not to add the additional information based on the color information, the work of adding the additional information by a user is not necessary.

(2) According to a second aspect, there is provided the image processing apparatus according to the first aspect, wherein a background color of the image of the one page is extracted by the extraction unit as the color information.

According to the second aspect, the image processing apparatus can determine whether or not to specify the page partition, based on the background color. For example, when the background color is a predetermined color, there is a high possibility that the corresponding image is a first page or last page of a predetermined group. Accordingly, it is determined that it is possible to specify the page partition. Thereby, since the image processing apparatus can correctly specify the page partition and attach the additional information thereto, it is possible to increase the accuracy of the searching.

(3) According to a third aspect, there is provided the image processing apparatus according to the first aspect, wherein a ratio of a background color of the image of the one page to all of the colors of the image of the one page is extracted by the extraction unit as the color information.

According to the third aspect, the image processing apparatus can determine whether it is possible to specify the page partition, based on the ratio of the background color. For example, when the ratio of the background color is high, information such as letters included in the image is relatively small. Accordingly, it is assumed that the corresponding image is a first page or last page of a predetermined group. In this case, the image processing apparatus determines that it is possible to specify the page partition. Thereby, since the image processing apparatus can correctly specify the page partition and attach the additional information thereto, it is possible to increase the accuracy of the searching.

(4) According to a fourth aspect, there is provided the image processing apparatus according to the first aspect, wherein a number of colors of the image of the one page is extracted by the extraction unit as the color information.

According to the fourth aspect, the image processing apparatus can determine whether it is possible to specify the page partition, based on the number of colors. For example, when the number of colors is large, it may mean that information such as photograph and graph is inserted by a large amount. Accordingly, it is assumed that the corresponding image is a first page or last page of a predetermined group. In this case, the image processing apparatus determines that it is possible to specify the page partition. Thereby, since the image processing apparatus can correctly specify the page partition and attach the additional information thereto, it is possible to increase the accuracy of the searching.

(5) According to a fifth aspect, there is provided the image processing apparatus according to the first aspect, wherein the extraction unit extracts the color information from a region of the image of the one page having a predetermined distance or larger from at least one end of the image of the one page.

According to the fifth aspect, the image processing apparatus can exclude the color information close to the end of the image from the determination target of determining whether the color information satisfies the predetermined condition. Thereby, since it is possible to extract the color information from a region other than a header, a footer and left and right ends in a page, it is possible to prevent the colors of the header, the footer and the left and right ends from influencing the color information. Therefore, the image processing apparatus can specify the page partition more accurately.

(6) According to a sixth aspect, there is provided the image processing apparatus according to the first aspect, wherein when a difference between the color information extracted from the image of the one page by the extraction unit and another color information extracted from an image of another page by the extraction unit is a predetermined degree or greater, the determination unit determines that the color information satisfies the predetermined condition, According to the sixth aspect, the image processing apparatus can determine whether is possible to specify the page partition by comparing the color information with another color information. When the color information is largely different from the another color information, the image processing apparatus determines that it is possible to specify the page partition. Accordingly, when the partition page is different from the other page, the image processing apparatus can correctly specify the partition page.

(7) According to a seventh aspect, there is provided the image processing apparatus according to the first aspect, wherein when the color information extracted by the extraction unit is a predetermined value or greater, the determination unit determines that the color information satisfies the predetermined condition.

According to the seventh aspect, when the page partition always has a predetermined feature, the image processing apparatus can determine that it is possible to easily specify the page partition by comparing the color information with a predetermined value.

(8) According to an eighth aspect, there is provided the image processing apparatus according to the first aspect, wherein the acquisition unit sequentially acquires an image of each of the plurality of pages included in the one file, and wherein each time when the acquisition unit acquires an image of one of the plurality of pages, the extraction unit extracts the color information from the acquired image of the one of the plurality of images.

According to the eighth aspect, it is possible to reduce the time that is necessary to extract the color information and to determine the partition page, compared to a configuration where all images of pages are acquired and then the color information is extracted.

(9) According to a ninth aspect, there is provided the image processing apparatus according to the first aspect, wherein when the determination unit determines that the color information satisfies the predetermined condition, the addition unit adds the additional information to the image of the one page from which the color information is extracted or an image of a next page of the image of the one page.

According to the ninth aspect, when the image of the one page is a first page of a predetermined group, the image processing apparatus attaches the additional information on the image of the one page. When the image of the one page is a last page of a predetermined group, the image processing apparatus attaches the additional information on an image of a next page of the one page. Thereby, the user can correctly specify the image of the first page of the predetermined group by searching the additional information.

(10) According to a tenth aspect, there is provided the image processing apparatus according to the first aspect, further comprising a division unit that, when the determination unit determines that the color information satisfies the predetermined condition, divides the one file into a first file including an image of a page preceding the image of the one page from which the color information is extracted and a second file including an image of a page succeeding the image of the one page from which the color information is extracted.

According to the tenth aspect, the image processing apparatus can divide the file for each of the predetermined groups. The user can make manage the file by individual files for each of predetermined groups.

(11) According to an eleventh aspect, there is provided the image processing apparatus according to the first aspect, further comprising a reading unit that reads the images of the plurality of pages, wherein the acquisition unit acquires the image of the one page from the images of the plurality of pages that are read by the reading unit.

According to the eleventh aspect, the image processing apparatus can directly read an image from a document on which the image is drawn.

(12) According to a twelfth aspect, there is provided an image processing method comprising: acquiring an image of one page from images of a plurality of pages included in one file; extracting color information, which is information about a color of the image of the one page acquired by the acquisition unit; determining whether the color information extracted by the extraction unit satisfies a predetermined condition for specifying a page partition; and adding additional information, by which the page partition can be searched, to at least one of the images of the plurality of pages, when the determination unit determines that the color information satisfies the predetermined condition.

According to the twelfth aspect, it is determined whether it is possible to specify the page partition, based on the color information extracted from the acquired image of one page. When it is determined that it is possible to specify the page partition, the searchable additional information is added. A user can refer to the additional information to easily search the page partition. Since it is automatically determined whether or not to add the additional information based on the color information, the work of adding the additional information by a user is not necessary.

(13) According to a thirteenth aspect, there is provided a computer readable recording medium storing a computer program, the computer program causing a computer to perform the method of; acquiring an image of one page from images of a plurality of pages included in one file; extracting color information, which is information about a color of the image of the one page acquired by the acquisition unit; determining whether the color information extracted by the extraction unit satisfies a predetermined condition for specifying a page partition; and adding additional information, by which the page partition can be searched, to at least one of the images of the plurality of pages, when the determination unit determines that the color information satisfies the predetermined condition.

According to the thirteenth aspect, it is determined whether it is possible to specify the page partition, based on the color information extracted from the acquired image of one page. When it is determined that it is possible to specify the page partition, the searchable additional information is added. A user can refer to the additional information to easily search the page partition. Since it is automatically determined whether or not to add the additional information based on the color information, the work of adding the additional information by a user is not necessary.

What is claimed is:

1. An image processing apparatus comprising:
   a processor; and
   a memory storing instructions that, when executed by the processor, causes the image processing apparatus to perform:
   acquiring an image of one page from images of a plurality of pages included in one file;
   extracting color information, which is information about a color of the image of the acquired one page;
   determining whether the extracted color information satisfies a predetermined condition for specifying a first page or a last page of a predetermined group;
   when the color information is determined to satisfy the predetermined condition for specifying the first page of the predetermined group, adding additional information, by which a page partition can be searched, to the image of the one page having the color formation that satisfies the predetermined condition for specifying the first page of the predetermined group; and
   when the color information is determined to satisfy the predetermined condition for specifying the last page of the predetermined group, adding the additional information to an image of a next page of the one page having the color information that satisfies the predetermined condition for specifying the last page of the predetermined group.

2. The image processing apparatus according to claim 1, wherein a background color of the image of the one page is extracted as the color information.

3. The image processing apparatus according to claim 1, wherein a ratio of a background color of the image of the one page to all of the colors of the image of the one page is extracted as the color information.

4. The image processing apparatus according to claim 1, wherein a number of colors of the image of the one page is extracted as the color information.

5. The image processing apparatus according to claim 1, wherein the color information is extracted from a region of the image of the one page having a predetermined distance or larger from at least one end of the image of the one page.

6. The image processing apparatus according to claim 1, wherein when a difference between the extracted color information and another color information extracted from an image of another page is a predetermined degree or greater, the color information is determined to satisfy the predetermined condition.

7. The image processing apparatus according to claim 1, wherein when the extracted color information is a predetermined value or greater, the color information is determined to satisfy the predetermined condition.

8. The image processing apparatus according to claim 1, wherein an image of each of the plurality of pages included in the one file is acquired sequentially, and
   wherein each time an image of one of the plurality of pages is acquired, the color information is extracted from the acquired image of the one of the plurality of images.

9. The image processing apparatus according to claim 1, further comprising dividing, when the determination unit determines that the color information satisfies the predetermined condition, the one file into a first file including an image of a page preceding the image of the one page from which the color information is extracted and a second file including an image of a page succeeding the image of the one page from which the color information is extracted.

10. The image processing apparatus according to claim 1, further comprising reading the images of the plurality of pages,
    wherein the image of the one page is acquired from the images of the plurality of pages that are read.

11. An image processing method comprising:
    acquiring an image of one page from images of a plurality of pages included in one file;
    extracting color information, which is information about a color of the image of the acquired one page;
    determining whether the extracted color information satisfies a predetermined condition for specifying a page partition;
    when the color information is determined to satisfy the predetermined condition for specifying the first page of the predetermined group, adding additional information, by which a page partition can be searched, to the image of the one page having the color information that satisfies the predetermined condition for specifying the first page of the predetermined group; and
    when the color information is determined to satisfy the predetermined condition for specifying the last page of the predetermined group, adding additional information to an image of a next page of the one page having the color information that satisfies the predetermined condition for specifying the last page of the predetermined group.

12. A computer readable recording medium storing a computer program, the computer program causing a computer to perform the method of:
    acquiring an image of one page from images of a plurality of pages included in one file;
    extracting color information, which is information about a color of the image of the acquired one page;
    determining whether the extracted color information satisfies a predetermined condition for specifying a page partition;
    when the color information is determined to satisfy the predetermined condition for specifying the first page of the predetermined group, adding additional information, by which a page partition can be searched, to the image of the one page having the color information that satisfies the predetermined condition for specifying the first page of the predetermined group; and
    when the color information is determined to satisfy the predetermined condition for specifying the last page of the predetermined group, adding additional information to an image of a next page of the one page having the color information that satisfies the predetermined condition for specifying the last page of the predetermined group.

\* \* \* \* \*